United States Patent [19]

Jones

[11] 4,298,304
[45] Nov. 3, 1981

[54] VEHICLES WITH DEMOUNTABLE BODIES

[75] Inventor: Anthony E. Jones, Frenchay, near Bristol, England

[73] Assignee: Brimec (U.K.) Limited, Avon, England

[21] Appl. No.: 961,818

[22] Filed: Nov. 17, 1978

[30] Foreign Application Priority Data

Nov. 17, 1977 [GB] United Kingdom ............... 22422/77
Jan. 10, 1978 [GB] United Kingdom ............... 00826/78

[51] Int. Cl.$^3$ ................................................ B60P 1/14
[52] U.S. Cl. .................................... 414/492; 414/494; 414/499; 414/506; 414/515
[58] Field of Search ............... 414/491, 492, 494, 498, 414/499, 500, 608, 477, 478, 479, 480, 559, 506, 538, 514, 515, 723; 280/477; 254/175.5, 325, 372

[56] References Cited

U.S. PATENT DOCUMENTS

| 2,745,566 | 5/1956 | Bouffard | 414/494 |
| 2,859,937 | 11/1958 | Robins et al. | 254/175.5 X |
| 3,272,546 | 9/1966 | Cooley | 414/491 X |
| 4,058,231 | 11/1977 | Visa et al. | 414/499 X |
| 4,119,225 | 10/1978 | Macht et al. | 414/723 |

FOREIGN PATENT DOCUMENTS

| 605462 | 6/1960 | Italy | 414/514 |
| 1234147 | 6/1971 | United Kingdom | 414/492 |

Primary Examiner—Trygve M. Blix
Assistant Examiner—Edmond G. Rishell, Jr.
Attorney, Agent, or Firm—Schwartz, Jeffery, Schwaab, Mack, Blumenthal & Koch

[57] ABSTRACT

A combination of a vehicle and a demountable body for transporting loads, the vehicle having a support which is movable between a horizontal position to support the body for transportation and an inclined position. The support carries an ended chain provided at one end with a hook for attachment to the body, and an endless chain provided with a pusher to engage the body, the chains being driven by a drive motor. The body has a guide arranged on lowering of the hook towards a lifting bar on the body, to guide the hook into engagement with the bar whereupon the hook is automatically releasably attached to the bar. With the support in its inclined position, the drive motor is operable in one direction to cause the ended chain to draw the body on to the vehicle either from a supporting surface below the support or from a supporting surface at the same height as the support, and the drive motor is operable in the reverse direction to cause the ended chain to control lowering of the body on to a supporting surface below the support. With the support in its horizontal position, the drive motor is operable in the reverse direction to cause the endless chain to push the body off the support on to a supporting surface at the same height as the support.

3 Claims, 9 Drawing Figures

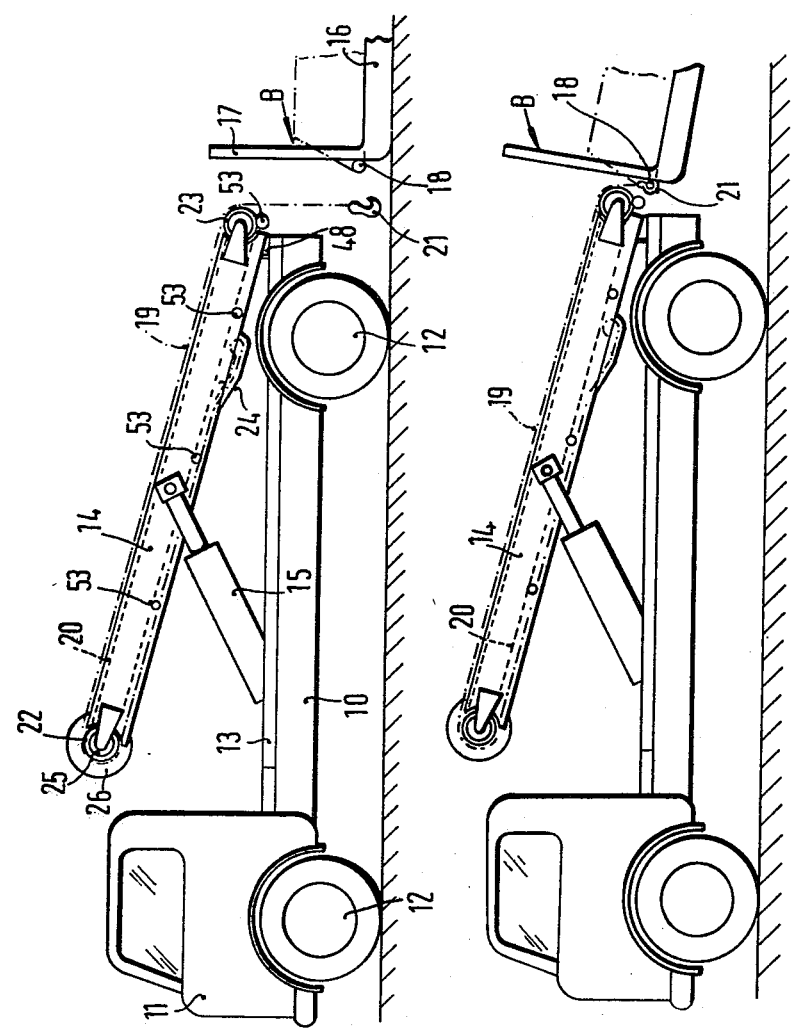

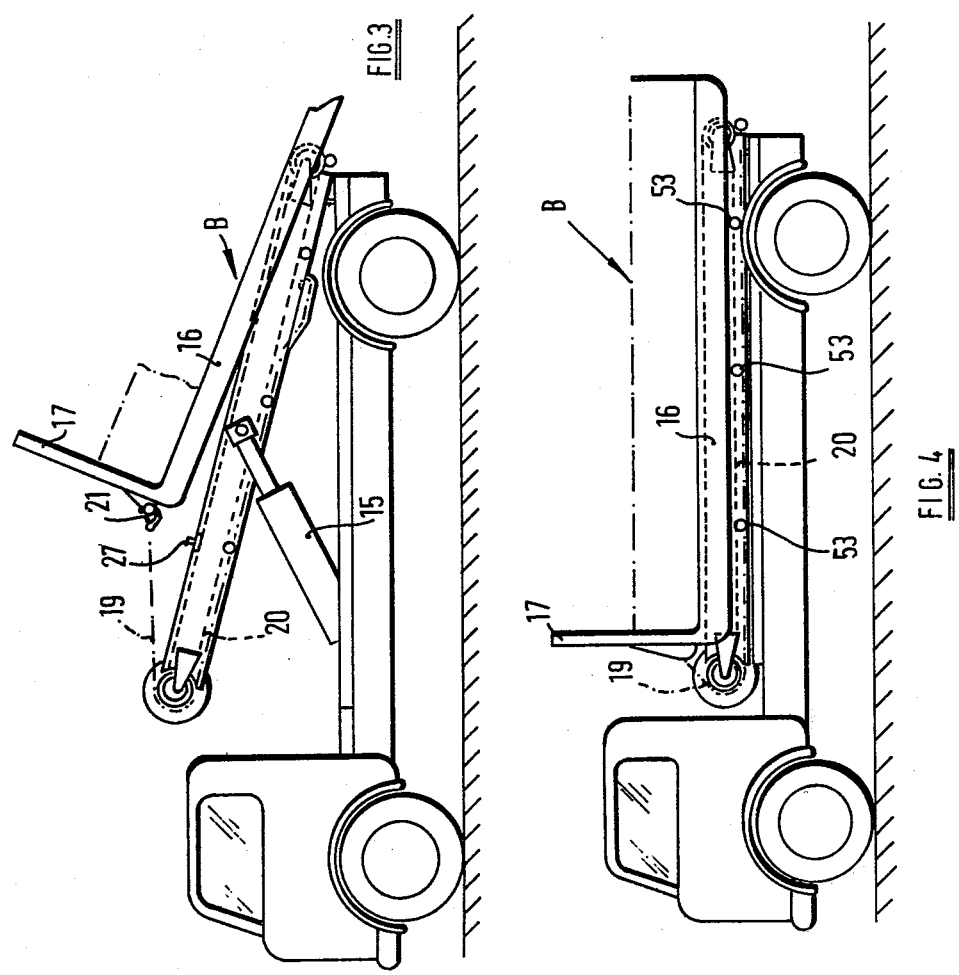

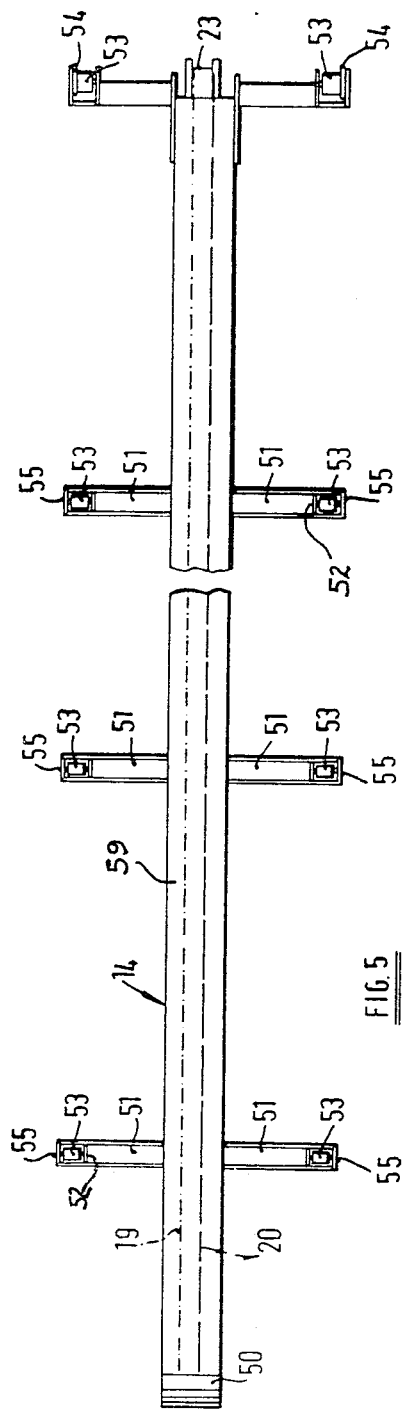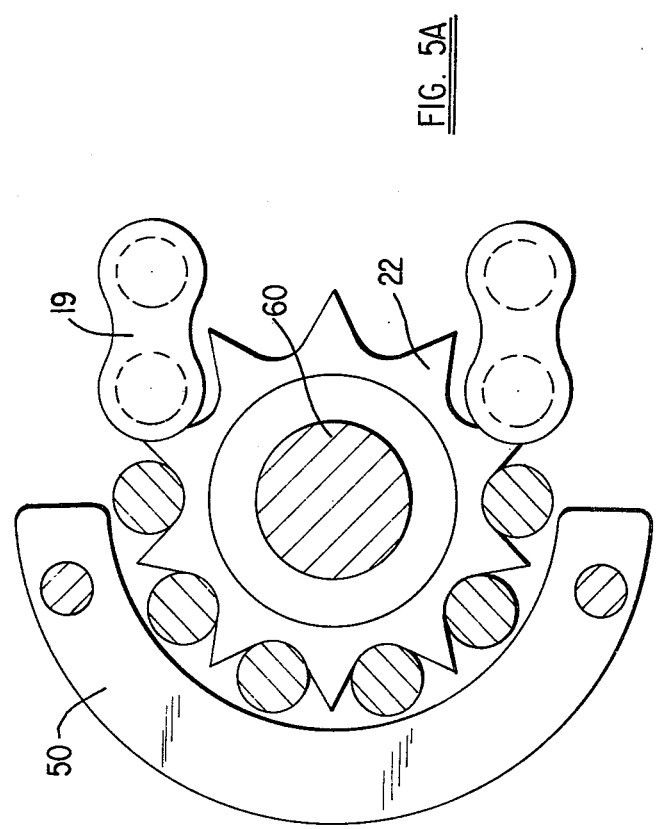
FIG. 5
FIG. 5A

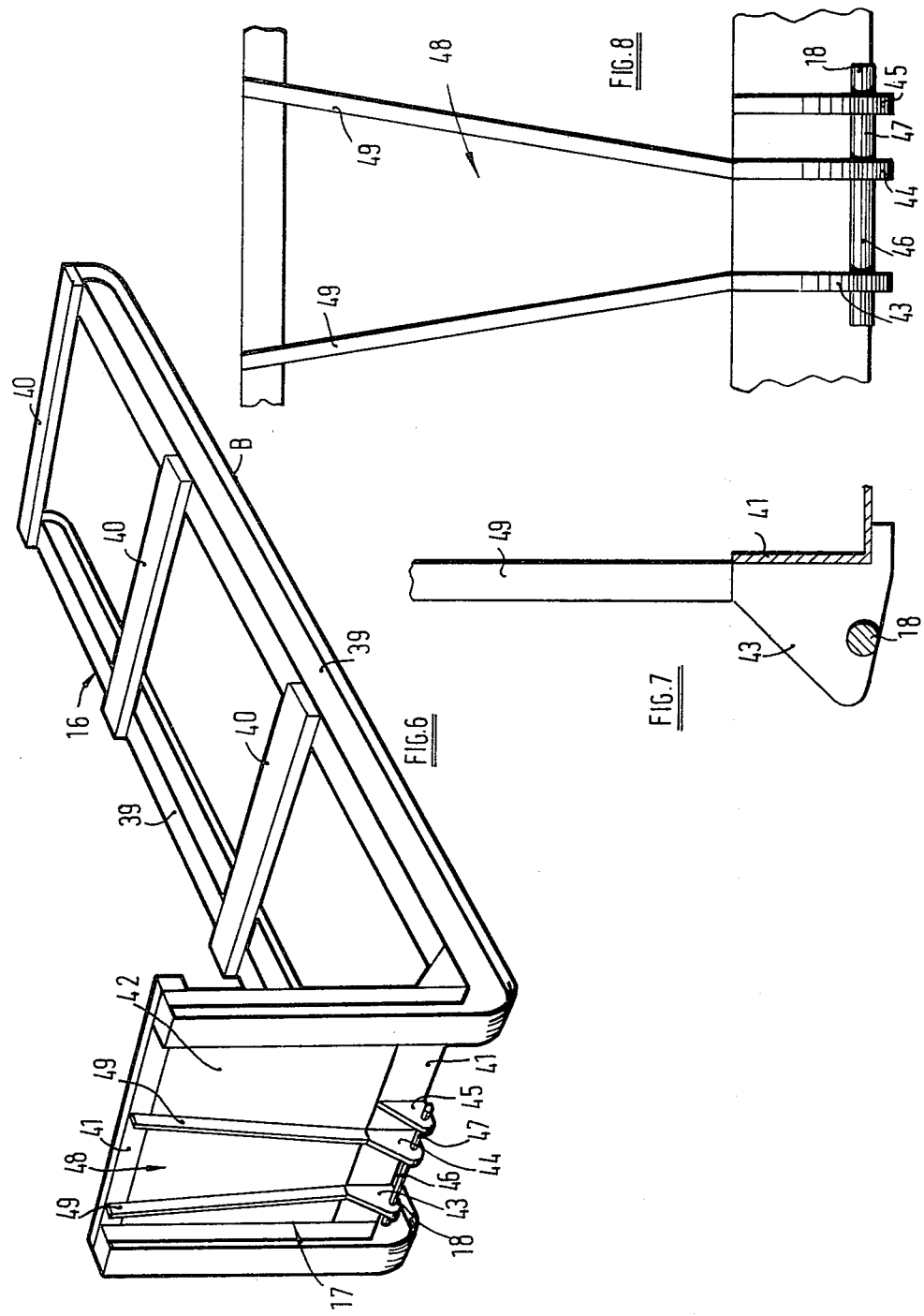

VEHICLES WITH DEMOUNTABLE BODIES

BACKGROUND OF THE INVENTION

1. Field of the Invention

This invention relates to a combination of a vehicle and a demountable body for the transportation of loads from place to place, the vehicle being provided with a support for the body and means for mounting the body thereon and for demounting the body therefrom. The invention also relates to a vehicle and to a demountable body for use in such a combination.

The invention is primarily applicable to a vehicle/demountable body combination of the type in which the support is mounted on the vehicle for tilting movement between a horizontal or substantially horizontal position to support the body on the vehicle for transportation, and an inclined position in which the mounting and demounting means are capable, on loading of the vehicle, of lifting the body from, for example the ground on to the lower end of the inclined support and drawing it upwardly along the latter into its transportation position, and on unloading of the vehicle, of moving the body, or controlling its movement under gravity, downwardly along the inclined support, off the latter and on to, for example, the ground.

In a combination of this type the mounting and demounting means of the vehicle may be required to transfer the body not only between the vehicle and the ground or other supporting surface below the support, but also between the vehicle and a trailer or other supporting surface at the same or substantially the same height as the support, the support being maintained horizontal or at a suitable inclination for this purpose and the said means being operable, on loading of the vehicle, to pull the body in a horizontal or substantially horizontal direction on to the support and, on unloading, to push the body off the support.

2. Description of the Prior Art

Known vehicle/demountable body combinations have various forms of mounting and demounting means, for example winches and endless chains with means for attachment to a demountable body, but these have various drawbacks and in particular are complicated in construction.

SUMMARY OF THE INVENTION

The primary object of the present invention is to provide an improved form of mounting and demounting means.

According to a first aspect of the invention there is provided a combination of a vehicle and a demountable body, the vehicle having a support for the body and means for mounting the body thereon and for demounting the body therefrom, wherein the mounting and demounting means of the vehicle comprises an ended flexible linear element one end of which is provided with means for attachment to the demountable body, and bi-directionally movable drive means having drive formations and means for maintaining said formations in positive driving engagement with the element on movement of the drive means in both of its directions of movement, whereby with the element attached to the body resting on the ground or other supporting surface below the support or on a trailer or other supporting surface at the same or substantially the same height as the support, the drive means may be operated to cause the element to draw the body into a mounted position on the vehicle, and with the element attached to the body on the vehicle the drive means may be operated to cause the element to control lowering of the body under gravity from the vehicle to the ground or other supporting surface below the support.

According to a second aspect of the invention there is provided a vehicle for use in combination with a demountable body, the vehicle having a support for the body and means for mounting the body thereon and for demounting the body therefrom, wherein the mounting and demounting means is of the form described above.

Preferably, to enable a demountable body to be transferred from the vehicle to a trailer or other supporting surface at the same or substantially the same height as the support of the vehicle, the mounting and demounting means further includes an endless flexible linear element carrying a pusher and arranged to run around two spaced direction-reversing means so that along one run of the element between the direction-reversing means the pusher travels along the support and may engage and push a body along and off the support.

According to a further aspect of the invention there is provided a vehicle for use in combination with a demountable body, the vehicle having a support which is mounted on the vehicle for tilting movement between a horizontal or substantially horizontal position to support the body on the vehicle for transportation and an inclined position, and the support being provided with means for mounting the body thereon and for demounting the body therefrom wherein the mounting and demounting means comprises (1) an ended flexible linear element which has at one end thereof means for attachment to a demountable body and is provided with drive means which may be operated (a) with the support in an inclined position and the element attached to a body resting on the ground or other supporting surface below the support, to cause the element to lift the body on to the lower end of the support and to draw it upwardly along the latter into a mounted position, (b) with the support in a horizontal or substantially horizontal position and the element attached to a body on a trailer or other supporting surface at the same or substantially the same height as the support, to cause the element to pull the body in a horizontal or generally horizontal direction on to the vehicle support, and (c) with the support in an inclined position and the element attached to a body in a mounted position on the support, to control movement of the body under gravity downwardly along the support and off the latter on to the ground or other supporting surface below the support, and (2) an endless flexible linear element carrying a pusher and provided with drive means, the element being arranged, on operation of the drive means, to run around two direction-reversing means or at adjacent the respective ends of the support so that along one run of the element between the direction-reversing means, with the support in a horizontal position and supporting a body in a mounted position, the pusher may engage the body and push it along the support, off the latter and on to a trailer or other supporting surface of the same or substantially the same height as the support.

According to a further aspect of the invention there is provided a demountable body for use in combination with a vehicle which has a support for the body and means for mounting the body thereon and for demounting the body therefrom, said means having attachment means for attachment to the body, wherein the body is provided with a transversely extending bar arranged for engagement by the attachment means of the mounting and demounting means of the vehicle on lowering of the attachment means towards said bar whereby the attachment means automatically becomes releasably attached to the bar, and a guide channel extending downwardly towards the bar and having downwardly converging sides arranged to guide the attachment means, on lowering thereof, towards and into engagement with the bar.

BRIEF DESCRIPTION OF THE DRAWINGS

FIGS. 1 to 5 and 5A of the accompanying drawings show one form of vehicle embodying the invention and FIGS. 6 to 8 shown one form of demountable body embodying the invention for use in combination with the vehicle.

FIG. 1 is a side view showing the tilting support and the mounting and demounting means of the vehicle in positions ready for mounting of a demountable body on the vehicle.

FIGS. 2 and 3 are similar views showing different stages in the mounting operation.

FIG. 4 is a similar view showing the positions of the said support and means with the demountable body in its mounted position on the vehicle.

FIG. 5 is a plan view of the tilting support of the vehicle.

FIG. 5A is a detailed section through the inner end of the tilting support, showing the curved guide plate within which the sprocket and chain rotate. Only two chain links have been illustrated, with the chain segments directly within the guide plate being shown individually and in section.

FIG. 6 is a perspective view of the demountable body.

FIG. 7 is a cross section through the lifting bar of the body.

FIG. 8 is a front view of the lifting bar.

DESCRIPTION OF THE PREFERRED EMBODIMENT

Referring to FIGS. 1 to 5 of the drawings, there is shown a vehicle in the form of a lorry comprising a chassis 10 and a cab 11 mounted on four wheels 12, and an engine (not shown) for propulsion of the vehicle.

The chassis 10 has a sub-frame 13 which carries a tilting support frame 14. This support frame is connected at its rear end to the rear end of the sub-frame 13 by a pivot mounting 48 so that it is movable between a horizontal position as shown in FIG. 4, and an inclined position as shown in FIGS. 1 to 3. Such movement is effected by two hydraulic piston and cylinder units 15, the cylinders of which are pivotally connected to the sub-frame 13 and the pistons of which are pivotally connected to the support frame 14. Alternatively, a scissors-type linkage may be connected between the sub-frame and the support frame, the linkage incorporating a piston and cylinder unit operable to extend and retract the linkage to raise and lower the support frame.

The tilting support frame 14 is provided with means for mounting a demountable body B on the vehicle and for demounting the body therefrom.

The body B may be of various forms suitable for carrying or supporting a load or goods, for example a closed container, a platform or a pallet, but in the example illustrated in FIGS. 6 to 8 it comprises a base 16 having a front end wall 17 carrying a transverse horizontal lifting bar 18. The base 16 comprises two longitudinal members 39 interconnected by three transverse members 40 and having upward extensions at one end which are interconnected by two cross members 41 and carry a panel 42 forming the front end wall 17.

The lifting bar 18 of the body B is carried by three spaced parallel plates 43, 44, 45, which are secured to the lower cross member 41. Two of the plates 43, 45, are disposed adjacent the ends of the bar so as to leave the ends projecting for engagement by hooks (not shown) provided on the vehicle to secure the body in position when being transported. The third plate 44 is disposed intermediate the end plates to divide the bar into a long portion 46 and a short portion 47.

A guide channel 48 extends downwardly towards the long bar portion 46 and is formed by two downwardly converging guide members 49 and the portion of the panel 42 between them, the members 49 being secured to the two cross members 41 and to the plates 43 and 44.

The mounting and demounting means of the vehicle comprise an ended chain 19 shown in dot-dash lines and an endless chain 20 shown in dashed lines.

The ended chain 19 has attached to one end thereof a hook 21 which is engageable with the long portion 46 of the lifting bar 18 of the demountable body. The chain extends around a portion of the toothed periphery of a drive sprocket 22 constituting guide means for the chain at the inner end of the tilting support frame 14 and, when the chain is in the position shown in FIG. 1, the portion thereof adjacent to the hook 21 extends over a pulley 23 (or a freely rotatable sprocket) at the outer end of the support frame. The portion of the chain between the pulley 23 and the sprocket 22 extends above and is supported by the flat upper surface of an elongate member 59 constituting part of the support frame and extending between the pulley and the sprocket. The end portion of the chain remote from the hook 21 and extending from the drive sprocket 22 is disposed in a guideway extending beneath the member 59 so that the chain extends in the form of a loop around the drive sprocket. The end of the guideway remote from the drive sprocket communicates with a tray 24 to receive and store the free end of the chain. Alternatively the guideway may be doubled back in the form of a loop to accommodate the free end of the chain.

Instead of a single ended chain 19, two or more chains could be used, the chains extending side by side and being attached together by the hook 21 at one end and by a pin at the other, free end.

The endless chain 20 runs around a drive sprocket 25 at the inner end of the tilting support frame 14 and the pulley 23 (or a freely rotatable sprocket) at the outer end of the frame, the sprocket 25 and the pulley 23 constituting guide means for the chain. The chain is provided with a pusher 27 arranged to engage the short portion 47 of the lifting bar 18 of the demountable body when the latter is in its mounted position on the vehicle. The chain is supported along its upper run by the flat upper surface of the elongate member 59 extending between the pulley 23 and the sprocket 25 and it may be supported along its lower run by a similar member.

The two drive sprockets 22 and 25 of the ended and endless chains 19 and 20 are keyed to a common shaft 60 which is coupled to a bi-directionally movable hydraulic motor 26 mounted on the inner end of the support frame 14. The ended chain 19 is maintained in positive driving engagement with the teeth of the sprocket 22 by means of a curved guide plate 50 which is mounted on the support frame and extends around and close to a portion of the periphery of the sprocket so that the chain runs betwen the sprocket and the guide plate. The guide plate also guides the chain into engagement with the sprocket. The pulley 23 is freely rotatable through the medium of bearings on a shaft fixed to the outer end of the support frame.

The support frame 14 includes four pairs of laterally projecting arms 51 each of which carries at its outer end a bracket 52 for a roller 53. The rollers 53 are disposed with their axes in a common plane and are arranged so that on movement of the body B along the support frame, the longitudinal members 39 of the body run on the rollers. The two rollers at the outer end of the support frame have flanges 54 at their outer ends to engage the outer sides of the members 39 and thereby guide the body on to and off the support frame. The brackets of the other rollers have upstanding guide parts 55 adjacent the outer ends of the rollers to engage the members 39 and thereby locate the body laterally as it moves along the support frame.

In an alternative arrangement, the body is guided for movement along the support frame by continuous support surfaces provided by the one limbs of two angle section members, the other limbs being arranged to engage the outer sides of the members 39 of the body thereby to locate the body against sideways movement.

The mounting and demounting means are operable as follows.

To mount the demountable body B on the vehicle from the ground (or other supporting surface below the support frame 14 of the vehicle), the piston and cylinder units 15 are operated to tilt the support frame 14 to its inclined position shown in FIGS. 1, 2 and 3. With the end portion of the ended chain 19 carrying the hook 21 extending beyond the pulley 23 at the outer end of the support frame, the hydraulic motor 26 is operated to lower the hook as shown in FIG. 1. As the hook is lowered with the body B positioned behind the vehicle, the hook moves downwardly through the guide channel 48 of the body and is guided by the converging guide members 49 into engagement with the long portion 46 of the lifting bar 18 whereupon it automatically becomes releasably attached to the long portion of the bar. With the hook engaged with the lifting bar, the hydraulic motor 26 is operated in the reverse direction to drive both the sprockets 22 and 25 and hence the chains 19 and 20 to cause the ended chain 19 to lift the adjacent end of the body B off the ground as shown in FIG. 2, and then on to the rollers 53 at the outer end of the support frame.

Continued operation of the hydraulic motor causes the chain 19 to draw the body B upwardly along the support frame as shown in FIG. 3 until it reaches its mounted position in which it is supported by the rollers 53. The piston and cylinder units 15 are then operated to lower the support frame into its horizontal position as shown in FIG. 4, and the vehicle can be then driven away to transport the demountable body and the load or goods carried thereby.

It will be appreciated that as the effective length of the ended chain 19 (between the hook 21 and the drive sprocket 22) is reduced, the length of the free end portion of the chain at the opposite side of the sprocket will increase. This increased length is taken up by the free end portion of the chain being received in the tray 24 and stored therein.

It will be noted that as the endless chain 20 is driven in unison with the ended chain 19, the pusher 27 comes into a position in which it is engaged by the short portion 47 of the lifting bar 18 of the body B as the latter is moved into its mounted position on the support frame.

To mount a body on the vehicle from a supporting surface, for example a trailer, at the same or substantially the same height as the support frame of the vehicle, the support frame is maintained in its horizontal position and, with the end portion of the chain 19 provided with the hook 21 extending beyond the pulley 23 at the outer end of the support frame, the hook 21 is attached to the long portion 46 of the lifting bar 18 of the body. The hydraulic motor is then operated to cause the chain 19 to pull the body in a horizontal or substantially horizontal direction onto the support frame and into its mounted position thereon.

In both cases, the demount the body B from the vehicle onto the ground (or other supporting surface below the support frame of the vehicle), the piston and cylinder units 15 are operated to tilt the support frame to its inclined position. As a result, the body tends to slide downwardly along the support frame under gravity but the hydraulic motor 26 is operated to control such movement of the body by restricting the rate of movement of the ended chain 19 under the pull exerted on it by the body. The procedure is therefore the reverse of that shown in FIGS. 1, 2 and 3, the body being allowed to slide downwardly off the support frame and onto the ground, whereupon the hook 21 is disengaged from the lifting bar 18, and the support frame is returned to its horizontal position. Movement of the body downwardly along the support frame is assisted by the pusher 27 of the endless chain 20 which pushes against the short portion 47 of the lifting bar 18 of the body.

To demount the body on to a trailer (or other supporting surface) at the same or substantially the same height as the support frame of the vehicle, the support frame is maintained horizontal (or is slightly inclined if necessary) and the hydraulic motor 26 is operated to cause the pusher 27 of the endless chain 20 to push against the short portion 47 of the lifting bar 18 of the body B and hence to push the body in a horizontal or generally horizontal direction along and off the support frame and on to the trailer. The lifting bar 18 of the body, being still engaged with hooks 21, draws with it the end portion of the chain 19 provided with the hook so that the chain, which is being driven by the sprocket 22, does not become slack, the free end portion of the chain being withdrawn from the tray 24.

The plates 43 carrying the lifting bar 18 are formed to assist engagement of the hook 21 with the bar.

I claim:

1. A vehicle having a support for a demountable body, means for moving the support between a horizontal or substantially horizontal position and an inclined position in which one end thereof is higher than the other end thereof and means for mounting a body on the support and for demounting the body therefrom, wherein the mounting and demounting means comprises (a) an ended chain, guide means for the chain comprising a sprocket mounted on the support at or adjacent said one end thereof, the chain extending around a portion of the periphery of the sprocket and having a portion thereof extending from the sprocket along the support towards said other end of the latter, attachment means provided at the free end of said portion of the chain for connection to a demountable body, and drive means drivingly connected to the sprocket, the guide means also comprising a guide mounted on the support and arranged to guide the chain into engagement with the sprocket on turning of the latter by the drive means and to maintain it in such engagement as it passes around the sprocket, and the drive means being operable to cause the chain, with the support in an inclined position or a horizontal or substantially horizontal position, to draw a body on to said other end of the support and along the latter into a mounted position, and with the support in an inclined position, to control movement of a body under gravity from a mounted position downwardly along the support and off said other end thereof, and (b) an endless flexible linear element which extends around two direction-reversing means mounted on the support at or adjacent the respective ends thereof and carries a pusher element, said drive means also being drivingly connected to said endless linear element and operable, with the support in a horizontal or substantially horizontal position, to cause the pusher to engage a body in a mounted position on the support and to push it along the support and off said other end of the latter.

2. A vehicle as claimed in claim 1 wherein the support is provided with storage means for receiving the end portion of the chain remote from the attachment means, as the chain is driven by the sprocket in a direction to draw a body on to the vehicle.

3. A vehicle having a support for a demountable body, means for moving the support between a horizontal or substantially horizontal position and an inclined position in which one end thereof is higher than the other end thereof, and means for mounting a body on the support and for demounting the body therefrom, wherein the mounting and demounting means comprises (a) an ended chain and guide means for the chain comprising a sprocket engaged by the chain and mounted on the support at or adjacent said one end thereof, a portion of the chain extending from said sprocket along the support towards said other end thereof and being provided at the free end thereof with attachment means for connection to a demountable body, and (b) an endless chain which extends around two direction-reversing means comprising sprockets engaged by the chain and mounted on the support at or adjacent the respective ends thereof and which carries a pusher element, the sprocket of the ended chain and that sprocket of the endless chain which is disposed at said one end of the support being mounted on a common drive shaft connected to a motor constituting drive means for both chains, the motor being operable (1) to cause the ended chain, with the support in an inclined position or a horizontal or substantially horizontal position, to draw a body on to said other end of the support and along the latter into a mounted position, and, with the support in an inclined position, to control movement of a body under gravity from a mounted position downwardly along the support and off said other end thereof, and (2) to cause the pusher element of the endless chain, with the support in a horizontal or substantially horizontal position, to engage a body in a mounted position, to engage a body in a mounted position on the support and to push it along the support and off said other end of the latter.

* * * * *